UNITED STATES PATENT OFFICE.

BENJAMIN A. PROPHET, OF CENTER TOWNSHIP, GREENE COUNTY, MISSOURI.

IMPROVEMENT IN EPITHEMS.

Specification forming part of Letters Patent No. 207,302, dated August 20, 1878; application filed May 14, 1878.

*To all whom it may concern:*

Be it known that I, BENJAMIN A. PROPHET, of Center township, in the county of Greene and State of Missouri, have invented certain new and useful Improvements in Medicines; and I do hereby declare that the following is a full, clear, and exact description thereof, which will enable others skilled in the art to which it appertains to make and use the same.

My invention relates to a medicine for the cure of the bites of all venomous reptiles, more especially snakes, and for the treatment of hydrophobia.

The ingredients and the method of its preparation and application are as follows: I take one part, by weight, of calomel, a similar quantity of copperas, and two parts, by weight, of *Lycopus,* or bugle-weed, and thoroughly compound the same, in a suitable mortar, to the consistency of a poultice, which I apply to the wound as soon after the bite as possible.

In this connection, I would state that after the poultice is applied, as aforesaid, I usually stimulate the system by administering a hot tea made of bugle-weed.

In practice, this medical compound is found to be an unfailing antidote for the bites or venom of all species of snakes and other reptiles, and has been applied in cases of supposed hydrophobia with results alike beneficial.

I claim—

The medical compound composed of calomel, copperas, and *Lycopus,* or bugle-weed, as herein described, and for the purpose set forth.

In testimony that I claim the foregoing as my own I affix my signature in presence of two witnesses.

BENJAMIN A. PROPHET.

Witnesses:
O. H. TRAVERS,
P. T. SIMMONS.